US011468754B2

(12) United States Patent
Yu et al.

(10) Patent No.: US 11,468,754 B2
(45) Date of Patent: Oct. 11, 2022

(54) SYSTEMS AND METHODS FOR VIDEO DISPLAY

(71) Applicant: ZHEJIANG DAHUA TECHNOLOGY CO., LTD., Zhejiang (CN)

(72) Inventors: Changli Yu, Hangzhou (CN); Xiaobo Yang, Hangzhou (CN); Lei Zheng, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/210,489

(22) Filed: Mar. 23, 2021

(65) Prior Publication Data
US 2021/0209910 A1    Jul. 8, 2021

Related U.S. Application Data

(63) Continuation of application No. PCT/CN2018/125344, filed on Dec. 29, 2018.

(30) Foreign Application Priority Data

Sep. 25, 2018 (CN) .......................... 201811113719.0

(51) Int. Cl.
G08B 13/196       (2006.01)
(52) U.S. Cl.
CPC . G08B 13/19693 (2013.01); G08B 13/19645 (2013.01); G08B 13/19656 (2013.01); G08B 13/19669 (2013.01)

(58) Field of Classification Search
CPC ................................................. G08B 13/19645
See application file for complete search history.

(56) References Cited

U.S. PATENT DOCUMENTS 8,274,564 B2    9/2012   Girgensohn et al.
9,491,414 B2    11/2016  Lasko
(Continued)

FOREIGN PATENT DOCUMENTS

CN    101872603 A    10/2010
CN    103595946 A    2/2014
(Continued)

OTHER PUBLICATIONS

International Search Report in PCT/CN2018/125344 dated Jun. 13, 2019, 4 pages.
(Continued)

Primary Examiner — Daniel T Tekle
(74) Attorney, Agent, or Firm — Metis IP LLC

(57) ABSTRACT

The present disclosure relates to systems and methods for video display. The system may include at least one processor that is directed to concurrently display a plurality of videos via a display device. Each of the plurality of videos may correspond to a camera channel. In response to receiving an input signal associated with at least one of the plurality of videos, the at least one processor is directed to jointly display the at least one of the plurality of videos and one or more correlated videos via the display device. The camera channels of the one or more correlated videos may be correlated with that of the at least one of the plurality of videos.

16 Claims, 12 Drawing Sheets

(56) References Cited

U.S. PATENT DOCUMENTS

| | | |
|---|---|---|
| 9,880,801 B2 | 1/2018 | Bull et al. |
| 10,007,400 B2 | 6/2018 | Kocienda et al. |
| 10,073,590 B2 | 9/2018 | Dascola et al. |
| 10,127,783 B2 | 11/2018 | Laska et al. |
| 2008/0088706 A1 | 4/2008 | Girgensohn et al. |
| 2011/0234807 A1 | 9/2011 | Jones et al. |
| 2012/0002050 A1 | 1/2012 | Taniguchi et al. |
| 2014/0320615 A1 | 10/2014 | Kuribayashi et al. |
| 2014/0359522 A1 | 12/2014 | Kim et al. |
| 2015/0215586 A1* | 7/2015 | Lasko ............ H04L 65/80 348/143 |
| 2017/0025038 A1 | 1/2017 | Oguchi et al. |
| 2018/0192005 A1 | 7/2018 | Watanabe et al. |
| 2019/0102903 A1* | 4/2019 | Siu ............ G08B 13/19632 |

FOREIGN PATENT DOCUMENTS

| | | |
|---|---|---|
| CN | 104506922 A | 4/2015 |
| CN | 105763851 A | 7/2016 |
| CN | 207184634 U | 4/2018 |
| JP | 2008017311 A | 1/2008 |
| KR | 20180013264 A | 2/2018 |

OTHER PUBLICATIONS

Written Opinion in PCT/CN2018/125344 dated Jun. 13, 2019, 4 pages.

The Extended European Search Report in European Application No. 18935771.8 dated Sep. 22, 2021, 8 pages.

First Office Action in Chinese Application No. 201811113719.0 dated Nov. 3, 2021, 17 pages.

\* cited by examiner (a)

(b)

(c)

(d)

(1)  (2)

SYSTEMS AND METHODS FOR VIDEO DISPLAY

CROSS-REFERENCE TO RELATED APPLICATIONS

This application is a continuation of International Patent Application No. PCT/CN2018/125344, filed on Dec. 29, 2018, which claims priority of Chinese Patent Application No. 201811113719.0, filed on Sep. 25, 2018, the contents of each of which are hereby incorporated by reference.

TECHNICAL FIELD

The present disclosure generally relates to methods, systems, and media for video processing. More particularly, the present disclosure relates to methods, systems, and media for video display.

BACKGROUND

At present, a Network Video Recorder (NVR) divides a display area into different rectangular areas to display previews of different videos. When an IP Camera (IPC) is connected, the video captured by the IPC may be displayed in one of the different rectangular areas. In some embodiments, the rectangular areas may be generated by equally dividing the display area into a number of blocks with a same size, such as 4 blocks, 9 blocks, 16 blocks, etc. The videos displayed in different blocks can be switched. For example, the video displayed in block 1 may be switched to be displayed in block 4.

In some embodiments, if the videos captured by IPCs belonging to a same multi-camera (e.g., a global camera including a gun camera and a dome camera, a trinocular eagle eye camera) are displayed in discontinuous rectangular areas, it may be difficult for a user to recognize the relevance between them.

SUMMARY

An aspect of the present disclosure may relate to a system for video display. The system may include at least one storage medium including a set of instructions, and at least one processor in communication with the at least one storage medium. When executing the set of instructions, the at least one processor is directed to cause the system to concurrently display a plurality of videos via a display device. Each of the plurality of videos may correspond to a camera channel. In response to receiving an input signal associated with at least one of the plurality of videos, the at least one processor is further directed to cause the system to jointly display the at least one of the plurality of videos and one or more correlated videos via the display device. The camera channels of the one or more correlated videos may be correlated with that of the at least one of the plurality of videos.

In some embodiments, the plurality of videos may be concurrently displayed on different regions of the display device.

In some embodiments, the input signal associated with the at least one of the plurality of videos may include a click operation in a region of the at least one of the plurality of videos.

In some embodiments, the at least one of the plurality of videos and the one or more correlated videos may be jointly displayed, without concurrently displaying any other videos of the plurality of videos.

In some embodiments, the camera channels of the at least one of the plurality of videos and the one or more correlated videos may be corresponding to different sensors of a multi-camera.

In some embodiments, to jointly display the at least one of the plurality of videos and the one or more correlated videos, the at least one processor is directed to cause the system to determine a second region of the display device to display each of the at least one of the plurality of videos and the one or more correlated videos. The second regions may be arranged on the display device according to a number of the at least one of the plurality of videos and the one or more correlated videos.

In some embodiments, to determine the second region of the display device to display each of the at least one of the plurality of videos and the one or more correlated videos, the at least one processor is directed to cause the system to determine a priority level for each of the at least one of the plurality of videos and the one or more correlated videos, and successively determine the second region of the display device to display each of the at least one of the plurality of videos and the one or more correlated videos based on the priority levels.

In some embodiments, a second region to display one video with a higher priority level may be determined before a second region to display another video with a lower priority level.

In some embodiments, the at least one processor is directed to cause the system to receive a user adjustment to at least one of the second regions on the display device, and adjust a size of the at least one of the second regions on the display device according to the user adjustment.

In some embodiments, the at least one processor is directed to cause the system to detect an input signal for independent display while jointly displaying the at least one of the plurality of videos and the one or more correlated videos, and in response to detecting the input signal for independent display, independently display one of the at least one of the plurality of videos and the one or more correlated videos.

Another aspect of the present disclosure may relate to a method for video display. The method may be implemented on a computing device including at least one processor and at least one storage medium. The method may include concurrently displaying a plurality of videos via a display device. Each of the plurality of videos may correspond to a camera channel. The method may also include, in response to receiving an input signal associated with at least one of the plurality of videos, jointly displaying the at least one of the plurality of videos and one or more correlated videos via the display device. The camera channels of the one or more correlated videos may be correlated with that of the at least one of the plurality of videos.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "unit," "module," and/or "engine" used herein are used to distinguish different components, elements, parts, section or assembly of different levels in an ascending order. However, the terms may be displaced by other expression if they may achieve the same purpose.

Figure 2:
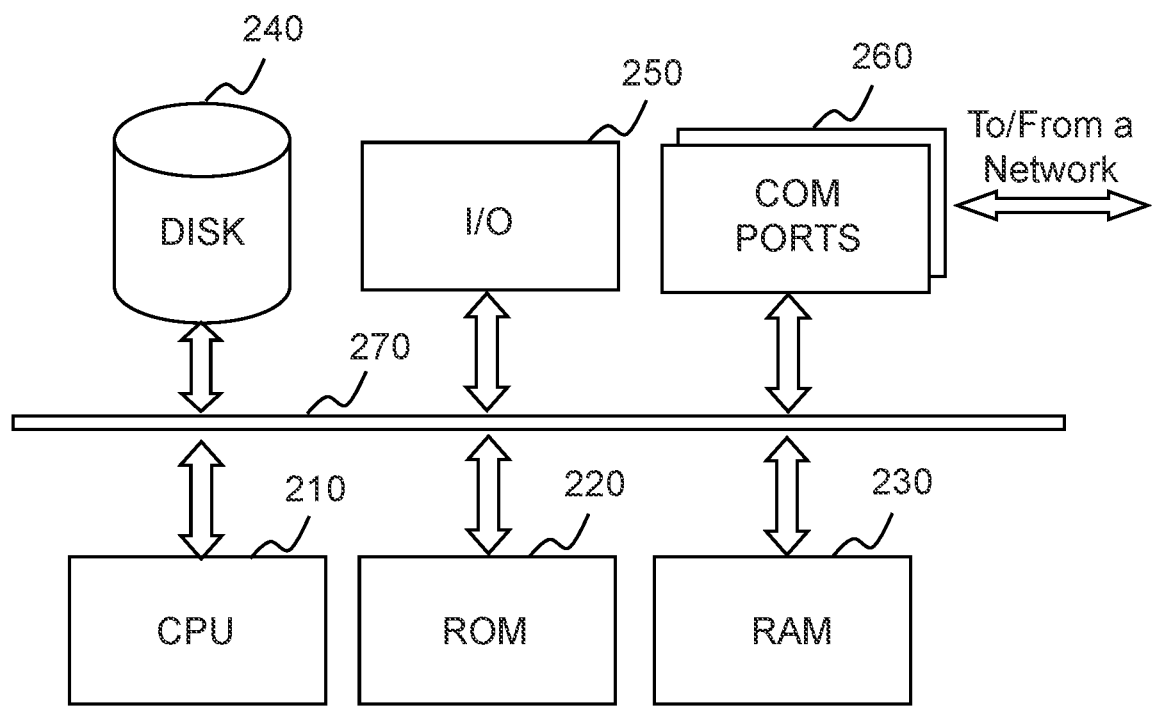
FIG. 2 is a block diagram illustrating an exemplary computing device according to embodiments of the present disclosure of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included of connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage.

It will be understood that when a unit, module or engine is referred to as being "on," "connected to" or "coupled to" another unit, module, or engine, it may be directly on, connected or coupled to, or communicate with the other unit, module, or engine, or an intervening unit, module, or engine may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

An aspect of the present disclosure relates to systems and/or methods for video display. In some embodiments, a plurality of videos may be concurrently displayed via a display device. Each of the plurality of videos may correspond to a camera channel. In some embodiments, a camera channel may have one or more correlated camera channels. In response to receiving an input signal associated with at least one of the plurality of videos, the system may jointly display the at least one of the plurality of videos and one or more correlated videos via the display device. The one or more correlated videos may be the video(s) whose camera channel(s) is correlated with that of the at least one of the plurality of videos. Further, the system may independently display one of the at least one of the plurality of videos and the one or more correlated videos in response to detecting an input signal for independent display.

Figure 1:
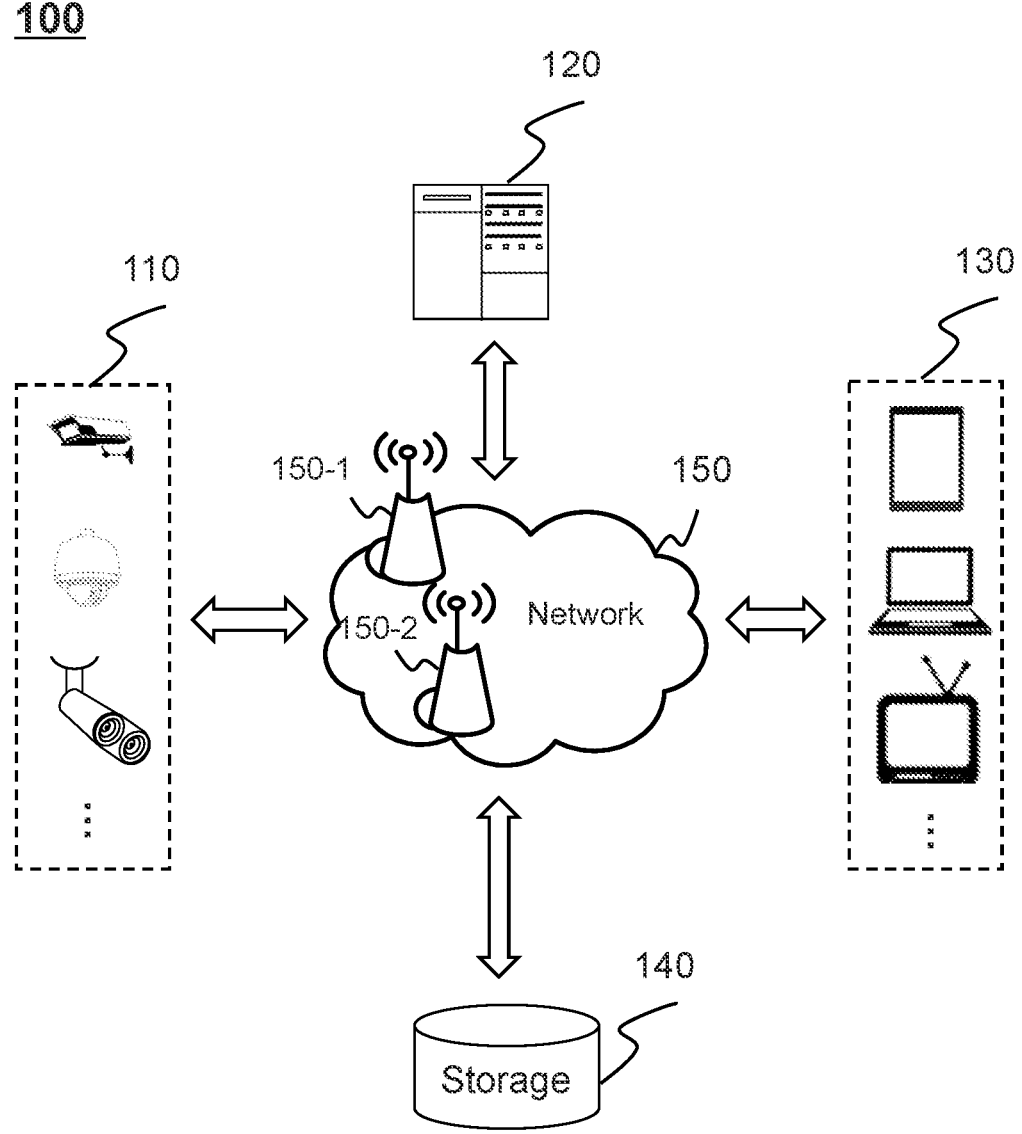
FIG. 1 is a schematic diagram illustrating an exemplary video processing system according to some embodiments of the present disclosure.

FIG. 1 is a schematic diagram illustrating an exemplary video processing system 100 according to some embodiments of the present disclosure. The video processing system 100 may include a video capturing device 110, a processing device 120, a terminal 130, a storage 140, a network 150, and/or any other suitable component for video processing in accordance with various embodiments of the disclosure.

In some embodiments, the video processing system 100 may be configured to display one or more images, one or more image sequences, one or more frames of a video, or one or more videos. For example, the video processing system 100 may concurrently display a plurality of images/videos on a display device. The plurality of images/videos may be displayed on different regions of the display device. In some embodiments, the video processing system 100 may switch the display mode based on an input by, for example, a user. For example, if the user desires to watch one of the plurality of videos alone, the user may instruct the video processing system 100 to display the video in full screen. For another example, if the user wants to watch some of the plurality of videos together, the user may instruct the video processing system 100 to jointly display some of the plurality of videos in the screen. In some embodiments, the video processing system 100 may jointly display the videos corresponding to a plurality of correlated camera channels.

The video capturing device 110 may be used to capture a video including one or more frames. The video may be offline or live streaming. The video capturing device 110 may be any suitable device that is capable of capturing a video. The video capturing device 110 may be and/or include a camera, a sensor, a video recorder, a mobile phone, or the like, or any combination thereof. For example, the video capturing device 110 may be and/or include any suitable type of camera, such as a fixed camera, a mobile camera, a dome camera, a covert camera, a Pan-Tilt-Zoom (PTZ) camera, a thermal camera, etc. As another example, the video capturing device 110 may be and/or include any suitable type of sensor, such as an audio sensor, a light sensor, a wind speed sensor, or the like, or a combination thereof. In some embodiments, the video capturing device 110 may be a multi-camera that is configured to capture multiple images or videos at different views simultaneously.

In some embodiments, the video capturing device 110 may acquire a plurality of videos, and send the plurality of videos to the processing device 120 for further processing. For example, the video capturing device 110 may obtain a live streaming video, and send the live streaming video to the processing device 120 through the network 150. The live streaming video may be sent as a series of frames. In some embodiments, the live streaming video may be a live surveillance video.

Data obtained by the video capturing device 110 (e.g., the image 111) may be stored in the storage 140, sent to the processing device 120 or the terminal 130 via the network 150. In some embodiments, the video capturing device 110 may be integrated in the terminal 130.

The processing device 120 may process images and/or videos according to one or more functions described in the present disclosure. The processing device 120 may process videos received from the video capturing device 110 and output processed videos to the storage 140 and/or the terminal 130 through the network 150. In some embodiments, the processing device 120 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof. In some embodiments, the processing device 120 may be integrated in the terminal 130. In some embodiments, the processing device 120 may automatically determine the display mode on a display device for displaying a plurality of videos. In some embodiments, the processing device 120 may have the function of displaying one or more images or videos.

The terminal 130 may receive, display, and/or process images. For example, the terminal 130 may receive videos from the video capturing device 110, the processing device 120, the storage 140, the network 150, etc. As another example, the terminal 130 may output or display the video received from the video capturing device 110 and/or a processed video received from the processing device 120 via the network 150 to a user. As another example, the terminal 130 may process videos received from the video capturing device 110, the processing device 120, the storage 140, the network 150, etc.

The terminal 130 may be connected to or communicate with the processing device 120. The terminal 130 may allow one or more operators (e.g., a keeper of a logistics warehouse, a law enforcement officer) to control the production and/or display of the data (e.g., the video captured by the video capturing device 110) on a display. The terminal 130 may include an input device, an output device, a control panel, a display (not shown in FIG. 1), or the like, or a combination thereof. In some embodiments, the terminal 130 may be regarded as a display device for displaying a plurality of videos. In some embodiments, the terminal 130 may be integrated with the processing device 120, and the integrated device may have the functions of processing and displaying videos.

An input device may be a keyboard, a touch screen, a mouse, a remote controller, a wearable device, or the like, or a combination thereof. The input device may include alpha-numeric and other keys that may be inputted via a keyboard, a touch screen (e.g., with tactile feedback), a speech input, an eye tracking input, a brain monitoring system, or any other comparable input mechanism. The input information received through the input device may be communicated to the processing device 120 via the network 150 for further processing. Another type of the input device may include a cursor control device, such as a mouse, a trackball, or cursor direction keys to communicate direction information and command selections to, for example, the processing device 120 and to control cursor movement on the display.

A display may display the information received (e.g., the image or video captured by the video capturing device 110) from other components of the video processing system 100. The information may include data before and/or after data processing, a parameter relating to image capturing and/or processing, or the like, or a combination thereof. The display may include a liquid crystal display (LCD), a light emitting diode (LED)-based display, a flat panel display or curved screen (or television), a cathode ray tube (CRT), or the like, or a combination thereof.

The storage 140 may acquire and/or store information of the components (e.g., the video capturing device 110, the processing device 120, or the terminal 130) of the video processing system 100. For example, the storage 140 may acquire and store videos from the processing device 120. In some embodiments, the information acquired and/or stored by the storage 140 may include programs, software, algorithms, functions, files, parameters, data, texts, numbers, images, or the like, or any combination thereof. In some embodiments, the storage 140 may store images received from the video capturing device 110 and processed images received from the processing device 120 with different formats including, for example, bmp, jpg, png, tiff, gif, pcx, tga, exif, fpx, svg, psd, cdr, pcd, dxf, ufo, eps, ai, raw, WMF, or the like, or any combination thereof. In some embodiments, the storage 140 may store algorithms applied in the processing device 120. In some embodiments, the storage 140 may include a mass storage, a removable storage, a volatile read-and-write memory, a read-only memory (ROM), or the like, or any combination thereof. Exemplary mass storage may include a magnetic disk, an optical disk, a solid-state drive, etc.

The network 150 may facilitate exchange of information. In some embodiments, one or more components in the video processing system 100 (e.g., the video capturing device 110, the terminal 130, the processing device 120 and the storage 140) may send information to other component(s) in the video processing system 100 via the network 150. In some embodiments, the network 150 may be any type of a wired or wireless network, or a combination thereof. Merely by way of example, the network 150 may include a cable network, a wire line network, an optical fiber network, a telecommunication network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 150 may include one or more network access points. For example, the network 150 may include wired or wireless network access points such as base stations and/or internet exchange points 150-1, 150-2 . . . through which one or more components of the video processing system 100 may be connected to the network 150 to exchange data and/or information.

It should be noted that the description above in relation to the video processing system 100 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. For example, the video capturing device 110 may be integrated in the terminal 130. In some embodiments, part or all of the video data generated by the video capturing device 110 may be processed by the terminal 130. In some embodiments, the video capturing device 110 and the processing device 120 may be implemented in one single device configured to perform the functions of the video capturing device 110 and the processing device 120 described in this disclosure. In some embodiments, the terminal 130 and the storage 140 may be part of the processing device 120. Similar modifications should fall within the scope of the present disclosure.

FIG. 2 is a block diagram illustrating an exemplary computing device 200 according to embodiments of the present disclosure of the present disclosure. The processing device 120 and/or the terminal 130 may be implemented using one or more computing devices 200 and/or one or more portions of the computing devices 200.

The computing device 200 may include a processor (CPU) 210, a read only memory (ROM) 220, a random-access memory (RAM) 230, a disk 240, an input/output (I/O) component 250, a COM ports 260, and an internal communication bus 270.

The processor 210 may execute instructions and/or data to perform one or more functions described in the present disclosure. For example, the processor 210 may identify the videos corresponding to correlated camera channels. In some embodiments, the processor 210 may include one or more processors (e.g., single-core processor(s) or multi-core processor(s)). Merely by way of example, the processor 210 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

Merely for illustration, only one processor 210 is described in the computing device 200. However, it should be noted that the computing device 200 in the present disclosure may also include multiple processors, thus operations and/or method steps that are performed by one processor 210 as described in the present disclosure may also be jointly or separately performed by the multiple CPUs/processors. For example, if in the present disclosure the processor 210 of the computing device 200 executes both step A and step B, it should be understood that step A and step B may also be performed by two different CPUs/processors jointly or separately in the computing device 200 (e.g., the first processor executes step A and the second processor executes step B, or the first and second processors jointly execute steps A and B).

The ROM 220, the RAM 230, and/or the disk 240 may store data and/or instructions that may perform one or more functions described in the present disclosure. For example, the ROM 220, the RAM 230, and/or the disk 240 may store instructions executed by the processor 210 to identify videos with correlated camera channels. In some embodiments, the RAM 230 may include a dynamic RAM (DRAM), a double date rate synchronous dynamic RAM (DDR SDRAM), a static RAM (SRAM), a thyristor RAM (T-RAM), and a zero-capacitor RAM (Z-RAM), or the like, or any combination thereof. In some embodiments, the ROM 220 may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, or the like, or any combination thereof. In some embodiments, the disk 240 may include a magnetic disk, an optical disk, a solid-state drive, a flash drive, a floppy disk, an optical disk, a memory card, a zip disk, a magnetic tape, or the like, or any combination thereof. In some embodiments, the ROM 220, the RAM 230, and/or the disk 240 may include a data storage, an application, etc. In some embodiments, the data storage may be any hardware or software for storing data, including a circuitry, a program, etc. In some embodiments, the application may include any application that may be installed in the computing device 200 for querying data.

The I/O 250 may support an input/output in the computing device 200. Merely by way of example, the i/O 250 may include a display, a keypad/keyboard, or the like, or any combination thereof. The display may be an output device for presenting information in visual form. In some embodiments, the display may include a liquid crystal display (LCD) panel, a light emitting diode display (LED) panel, an organic light emitting diodes (OLED) panel, a cathode ray tube (CRT) display, a plasma display, a touchscreen, a simulated touchscreen, the like, or any combination thereof. The keypad/keyboard may be an input device for typing in information from a user. In some embodiments, the keypad/keyboard may include a standard alphanumeric keyboard, a simplified alphanumeric keyboard, a flexible keyboard, a handheld keyboard, a software keyboard, an on-screen keyboard, a laser projection keyboard, a sense board, or the like, or any combination thereof.

The COM ports 260 may be connected to and from a network connected thereto to facilitate data communications. In some embodiments, the COM ports 260 may be interface with the network 150 and/or one or more components in the video processing system 100. In some embodiments, the COM ports 260 may be any type of wired or wireless network interface. Merely by way of example, the COM ports 260 may include a cable network interface, a wireline network interface, an optical fiber network interface, a telecommunications network interface, an intranet interface, an internet interface, a local area network (LAN) interface, a wide area network (WAN) interface, a wireless local area network (WLAN) interface, a metropolitan area network (MAN) interface, a wide area network (WAN) interface, a public telephone switched network (PSTN) interface, a Bluetooth network interface, a ZigBee network interface, a near field communication (NFC) network interface, or the like, or any combination thereof. In some embodiments, the COM ports 260 may be implemented according to programming and/or computer language(s). The COM ports 260 may include circuitry for coupling the computing device 200 to one or more networks, and is constructed for use with one or more communication protocols and technologies including, global system for mobile communications (GSM), code-division multiple access (CDMA), time-division multiple access (TDMA), general packet radio service (GPRS), enhanced data rate for GSM evolution (EDGE), wideband code division multiple access (WCDMA), high speed downlink packet access (HSDPA), long term evolution (LTE), user datagram protocol (UDP), transmission control protocol/Internet protocol (TCP/IP), short message service (SMS), wireless application protocol (WAP), ultra wide band (UWB), IEEE 802.16 worldwide interoperability for microwave access (WiMax), session initiated protocol/real-time transport protocol (SIP/RTP), or any of a variety of other wireless communication protocols.

The internal communication bus 270 may transfer information and/or data between one or more components of the computing device 200. For example, the internal communication bus 270 may connect the processor 210 with a storage (e.g., the RAM 230, the ROM 220, etc.) for exchanging information and/or data. In some embodiments, the internal communication bus 270 may include a hardware component and/or a software implementation. For example, the internal communication bus 270 may include a wire, an optical fiber, a cable, a communication protocol, or the like, or any combination thereof.

Figure 3:
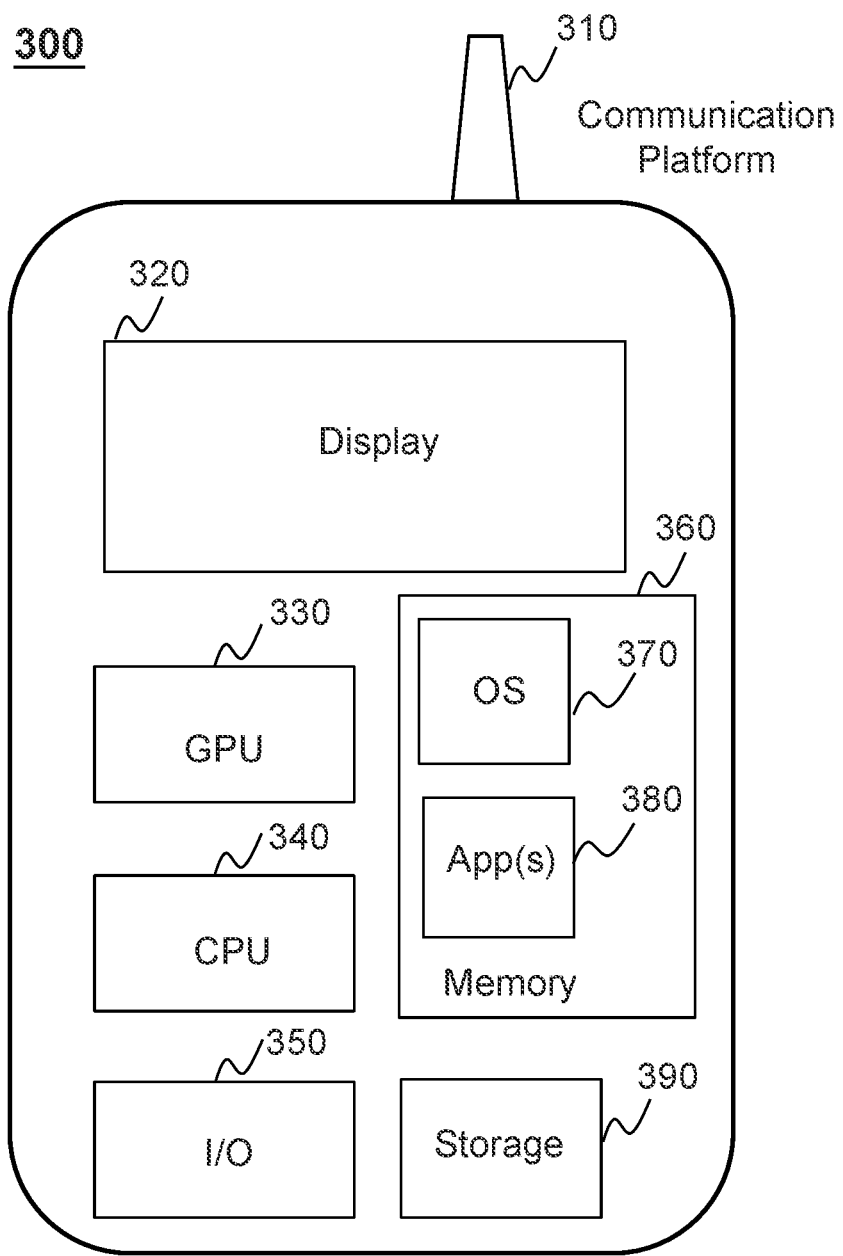
FIG. 3 is a schematic diagram illustrating exemplary hardware and/or software components of an exemplary mobile device on which a terminal may be implemented according to some embodiments of the present disclosure.

FIG. 3 is a schematic diagram illustrating exemplary hardware and/or software components of an exemplary mobile device 300 on which the terminal 130 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to the processing device 120. User interactions with the information stream may be achieved via the I/O 350 and provided to the processing device 120 and/or other components of the video processing system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
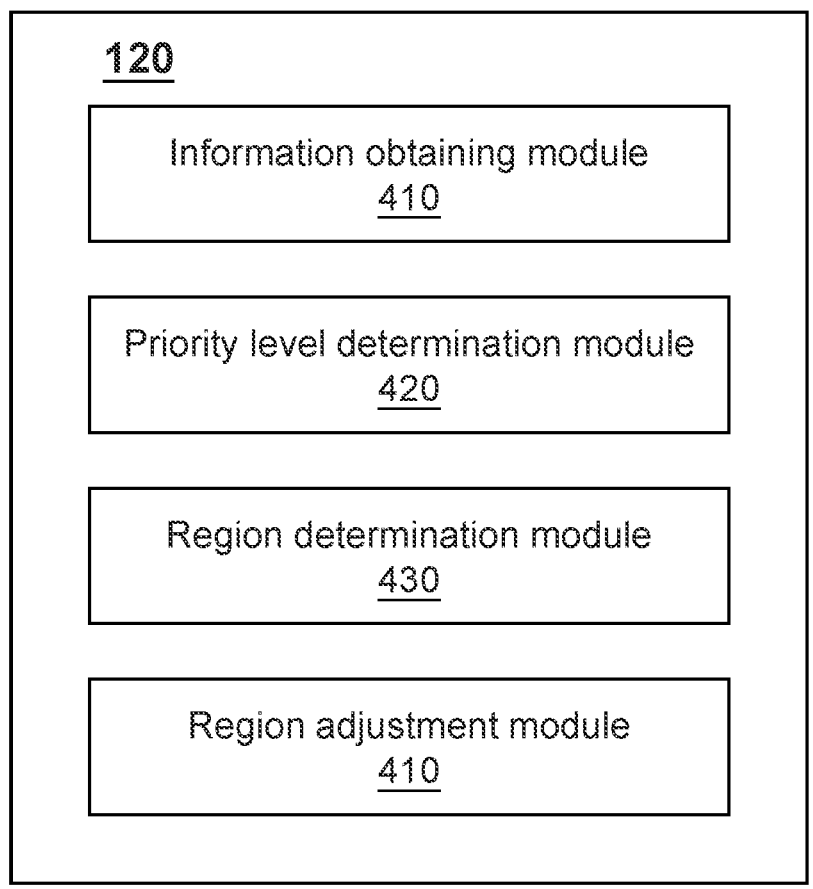
FIG. 4 is a block diagram illustrating an exemplary processing device according to some embodiments of the present disclosure.

FIG. 4 is a block diagram illustrating an exemplary processing device according to some embodiments of the present disclosure.

The processing device 120 may include an information obtaining module 410, a priority level determination module 420, a region determination module 430, and a region adjustment module 440. The processing device 120 may include more or fewer components without loss of generality. For example, two of the modules may be combined into a single module, or one of the modules may be divided into two or more modules. As another example, one or more of the modules may reside on different computing devices (e.g., a desktop, a laptop, a mobile device, a tablet computer, a wearable computing device, or the like, or a combination thereof). As still another example, the processing device 120 may be implemented on the computing device 200 shown in FIG. 2.

Here and also throughout the present disclosure, a module may be implemented in many different ways and as hardware, software or in different combinations of hardware and software. For example, all or parts of a module implementations may be a processing circuitry that may include part or all of an instruction processor, such as a central processing unit (CPU), a microcontroller, a microprocessor; or an application specific integrated circuit (ASIC), a digital signal processor (DSP), a digital signal processing device (DSPD), a programmable logic device (PLD), a field programmable gate array (FPGA), a controller, other electronic components; or as circuitry that includes discrete logic or other circuit components, including an analog circuit component, a digital circuit component or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

The information obtaining module 410 may be configured to obtain information related to video display. For example, the information obtaining module 410 may obtain a video and the information of its corresponding camera channel. The information obtaining module 410 may also obtain the information of the correlated camera channels of each camera channel. In some embodiments, the information obtaining module 410 may obtain information related to a user input, e.g., a user adjustment to one or more regions on a display device.

The priority level determination module 420 may be configured to determine a priority level for each of a plurality of camera channels. In some embodiments, the priority level determination module 420 may determine the priority level for each of the plurality of camera channels based on the properties of the plurality of camera channels (e.g., whether a camera channel is a primary camera channel) or the properties of the videos corresponding to the plurality of camera channels (e.g., the resolution ration of a video, the video frame size of a video).

The region determination module 430 may be configured to determine one or more regions of a display device to display one or more videos. In some embodiments, the region determination module 430 may equally or unequally divide the display device into the one or more regions. In some embodiments, the region determination module 430 may determine the regions based on the number of the one or more videos, the priority levels of the one or more videos, etc.

The region adjustment module 440 may be configured to adjust the size of a region to display a video. In some embodiments, the region adjustment module 440 may resize the size of a target region according to a user adjustment, and correspondingly resize the sizes of one or more other videos (if any) that are jointly displayed on a display device with the target region.

Figure 5:
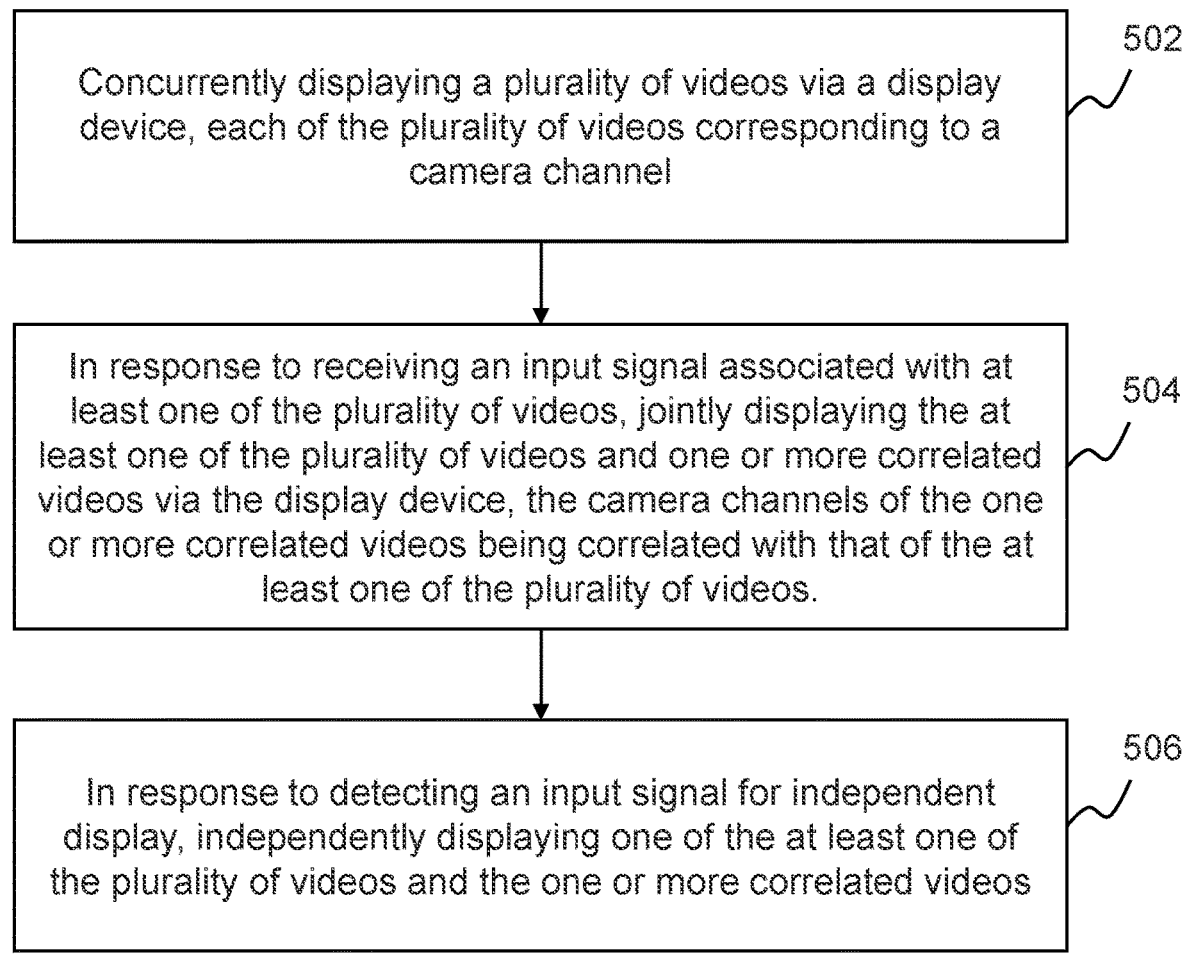
FIG. 5 is a flowchart illustrating an exemplary process for displaying videos according to some embodiments of the present disclosure.

FIG. 5 is a flowchart illustrating an exemplary process for displaying videos according to some embodiments of the present disclosure. The process 500 may be executed by the video processing system 100. For example, the process 500 may be implemented as a set of instructions (e.g., an application) stored in the storage ROM 220 or RAM 230. The CPU 210 may execute the set of instructions and may accordingly be directed to perform the process 500. Specifically, the process 500 may be executed by the modules in the processing device 120. The operations of the illustrated process presented below are intended to be illustrative. In some embodiments, the process may be accomplished with one or more additional operations not described, and/or without one or more of the operations discussed. Additionally, the order in which the operations of the process/method as illustrated in FIG. 5 and described below is not intended to be limiting.

In 502, the processing device 120 may concurrently display a plurality of videos via a display device. The display device may be a display component integrated in the processing device 120, or a device having a display function (e.g., the terminal 130) and coupled with the processing device 120.

The plurality of videos may be obtained from the video capturing device 110, or the storage 140 via the network 150. Each of the plurality of videos may be generate by a camera channel. As used herein, a camera channel may refer to a video capturing device 110 or a video acquisition component of the video capturing device 110 from which video data is received. For example, the video data may be received from different video capturing devices 110 (e.g., different surveillance cameras). As another example, the video data may be received from different video acquisition components of one video capturing device 110 (e.g., different lenses of a multi-camera).

In some embodiments, the display device may be divided into multiple regions for displaying the plurality of videos. For example, the display device may be divided into 4 regions, 9 regions, 16 regions, etc. The number of the divided regions may be no less than the number of the plurality of videos such that each of the plurality of videos can be assigned with a distinctive region for displaying. In some embodiments, the display device may be equally divided such that the multiple regions for displaying the plurality of videos may have a same size.

In 504, in response to receiving an input signal associated with at least one of the plurality of videos, the processing device 120 may jointly display the at least one of the plurality of videos and one or more correlated videos via the display device. That two videos correlate with each other may denote that the camera channels of the two videos correlate with each other.

In some embodiments, the information of correlated camera channels may be stored in a storage device (e.g., the storage 140, the RAM 230, the ROM 220) in the video processing system 100. For each video, the processing device 120 may determine its corresponding camera channel and further identify its correlated video(s) (if any) by recognizing the correlated camera channel(s) of its corresponding camera channel.

The correlation between the camera channels may be established according to various rules. For example, the camera channels belonging to a same multi-camera may be determined to be correlated with each other. As another example, the camera channels that are installed within a same region may be determined to be correlated with each other. As still another example, the camera channels that are arranged to monitor a same area (e.g., a region of interest) may be determined to be correlated with each other. In some embodiments, the correlation between the camera channels may be determined by a user according to actual needs. For example, the user may group all the camera channels in the video displaying system 100 into different groups, and the camera channels belonging to a same group may be determined to be correlated with each other. Specifically, the user may group all the camera channels that are mounted at each entrance of a community into a same group, and thus the videos captured by the camera channels at the entrances of the community may be correlated with each other.

The input signal associated with at least one of the plurality of videos may indicate a further operation to be performed on the at least one of the plurality of videos. The further operation may include jointly displaying the at least one of the plurality of videos and one or more of its correlated videos on the display device. In some embodiments, the input signal may be input by a user through an interface of the display device. For example, the input signal associated with the at least one of the plurality of videos may be a click operation by a mouse in the region of the at least one of the plurality of videos. The click operation may be a single click, a double click, a triple click, etc. As another example, the input signal associated with the at least one of the plurality of videos may be a touch by a user in the region of the at least one of the plurality of videos on the display device. As another example, the input signal associated with the at least one of the plurality of videos may be a rolling operation of the mouse in the region of the at least one of the plurality of videos. In some embodiments, the input signal may be a voice control signal, and the processing device 120 may parse the voice signal and generate a computer recognizable instruction to control the display device to display the videos.

In the joint display, the processing device 120 may resize the regions of the at least one of the plurality of videos and the one or more correlated videos on the display device. In some embodiments, the display device may only display the at least one of the plurality of videos and the one or more correlated videos, without concurrently displaying any other video of the plurality of videos. More descriptions regarding the resizing operation may be found elsewhere in the present disclosure (e.g., in FIG. 7 and FIG. 11, and the descriptions thereof). In some embodiments, the processing device 120 may enlarge the regions of the at least one of the plurality of videos and the one or more correlated videos, concurrently displaying other videos but shrinking the regions thereof on the display device. In some embodiments, the processing device 120 may generate an overlay region on the display device to jointly display the at least one of the plurality of videos and the one or more correlated videos, while leaving the original display of the plurality of videos as a background.

In 506, in response to detecting an input signal for independent display, the processing device 120 may independently display one of the at least one of the plurality of videos and the one or more correlated videos.

In some embodiments, the input signal for independent display may be input by a user through an interface of the display device. For example, the input signal for independent display may be a click operation by a mouse in the region of one of the at least one of the plurality of videos and the one or more correlated videos. The click operation may be a single click, a double click, a triple click, etc. As another example, the input signal for independent display may be a touch by a user in the region of one of the at least one of the plurality of videos and the one or more correlated videos. As another example, the input signal for independent display may be a rolling operation of the mouse in the region of one of the at least one of the plurality of videos and the one or more correlated videos. In some embodiments, the input signal for independent display may be a voice control signal, and the processing device 120 may parse the voice signal and generate a computer recognizable instruction to control the independent display of one of the at least one of the plurality of videos and the one or more correlated videos.

For brevity, the input signal described in operation 504 may be referred to as first input signal, and the input signal described in operation 506 may be referred to as second signal. The first input signal and the second input signal may be generated according to a same or different operations. For example, both of the first input signal and the second input signal may be generated by a double click of a mouse in a certain region of the display device. As another example, the first input signal may be generated by a left click of a mouse, and the second input signal may be generated by a right click of the mouse.

It should be noted that the above description of video processing is merely provided for the purposes of illustration, and not intended to limit the scope of the present disclosure. For persons having ordinary skills in the art, various variations and modifications may be performed in the light of the present disclosure. For example, operation 506 may be performed before operation 504. In such case, the processing device 120 may independently display one of the plurality of videos on the display device after receiving an input signal (e.g., a click of mouse) according to a similar operation as operation 506, and then jointly display the one of the plurality of videos and its correlated videos after receiving another input signal (e.g., a click of mouse) according to a similar operation as operation 504.

Figure 6:
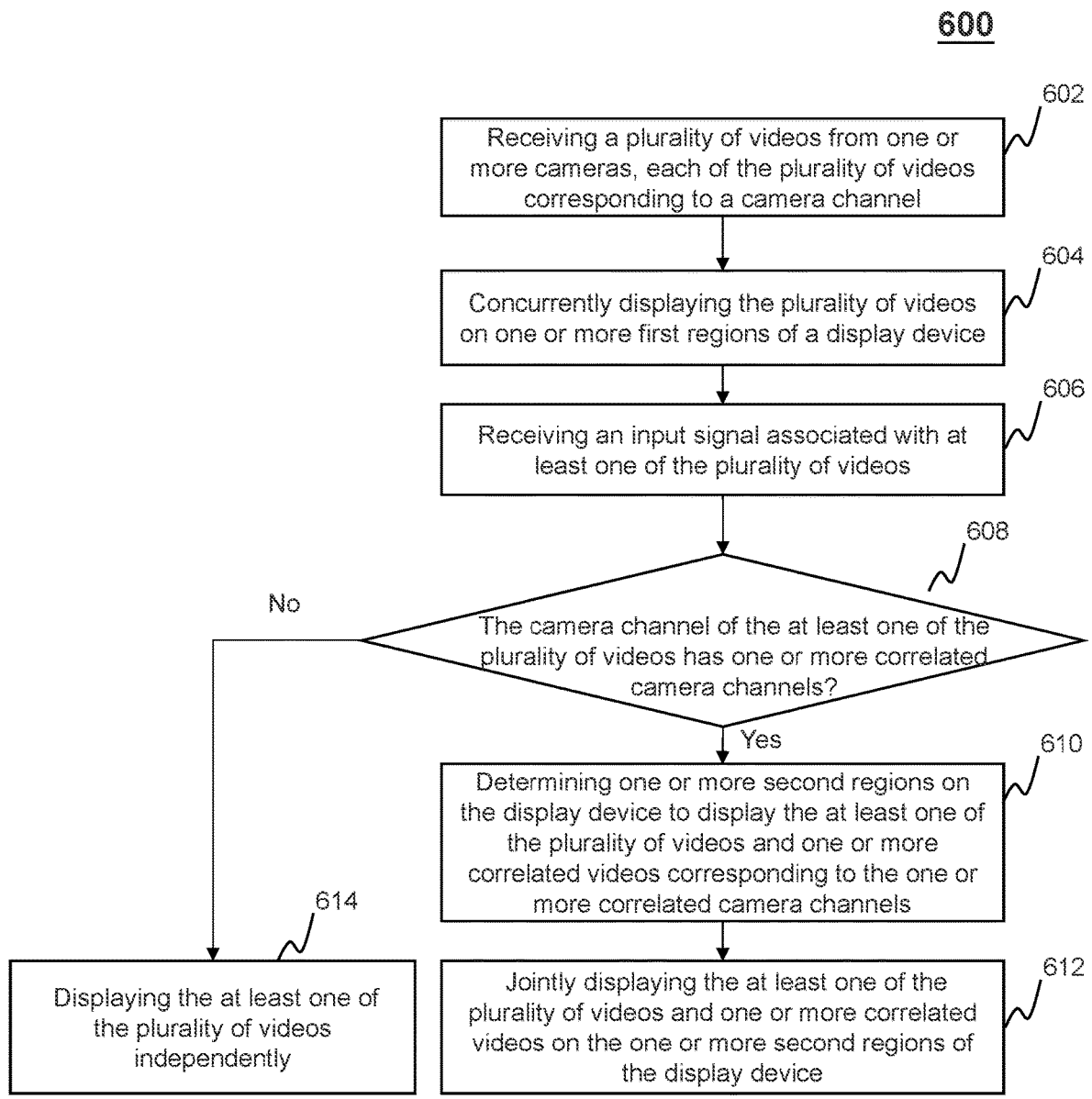
FIG. 6 is a flowchart illustrating an exemplary process for determining videos for displaying according to some embodiments of the present disclosure.

FIG. 6 is a flowchart illustrating an exemplary process for determining videos for displaying according to some embodiments of the present disclosure. The process 600 may be executed by the video processing system 100. For example, the process 600 may be implemented as a set of instructions (e.g., an application) stored in the storage ROM 220 or RAM 230. The CPU 210 may execute the set of instructions and may accordingly be directed to perform the process 600. Specifically, the process 600 may be executed by the modules in the processing device 120. The operations of the illustrated process presented below are intended to be illustrative. In some embodiments, the process 600 may be accomplished with one or more additional operations not described, and/or without one or more of the operations discussed. Additionally, the order of the operations of the process as illustrated in FIG. 6 and described below is not intended to be limiting.

In 602, the processing device 120 may receive a plurality of videos captured by one or more cameras.

In some embodiments, the one or more cameras may include a multi-camera with multiple camera channels. Each of the multiple camera channels may provide one of the plurality of videos. Additionally or alternatively, the one or more cameras may include multiple IPCs each of which has one camera channel. Each of the multiple IPCs may provide one of the plurality of videos.

In 604, the processing device 120 may concurrently display the plurality of videos on one or more first regions of a display device.

In some embodiments, the display device described herein may be same as or similar to the display device described in operation 502. The display device may be divided into a plurality of first regions for displaying each of the plurality of videos. The number of the divided first regions may be no less than the number of the plurality of videos. In some embodiments, the display device may be equally divided, and thus the plurality of first regions may have a same size. In some embodiments, the plurality of videos may be displayed in a specific order. For example, the processing device 120 may display the videos corresponding to a multi-camera in consecutive first regions. In some embodiments, the displaying order of the plurality of videos may be manually adjusted. For example, the processing device 120 may exchange the display regions of two videos according to a user instruction.

In some embodiments, the plurality of videos may be real-time videos, and the processing device 120 may receive the video streams of the plurality of videos from their corresponding camera channels, respectively. In some embodiments, the plurality of videos may be historical videos stored in a storage device (e.g., the storage 140, the RAM 230, the ROM 220). The processing device 120 may retrieve the historical videos generated at any time point, or within any time interval, and display them on display device.

In 606, the processing device 120 may receive an input signal associated with at least one of the plurality of videos. More description of the input signal associated with the at least one of the plurality of videos may be found elsewhere in the present disclosure (e.g., in operation 504), and is not repeated herein.

For convenience of description, a click operation of a mouse may be taken as an example to generate the input signal. The input signal associated with at least one of the plurality of videos may be a signal generated in response to a click operation of the mouse in the first region(s) of the at least one of the plurality of videos on the display device. The click operation of the mouse may be a single click, a double click, or a triple click.

In some embodiments, the processing device 120 may receive the input signal and locate the position of the click operation. Then, the processing device 120 may identify the first region(s) in which the click operation is executed. For example, the processing device 120 may construct a coordinate system for the display area of the display device. The processing device 120 may identify the coordinate of the click operation, and further determine the first region to which the coordinate of the click operation belongs.

In 608, the processing device 120 may determine whether the camera channel of the at least one of the plurality of videos has one or more correlated camera channels.

The correlation between the camera channels may be established according to various rules. For example, the camera channels belonging to a same multi-camera may be determined to be correlated with each other. As another example, the camera channels that are installed within a same region may be determined to be correlated with each other. As still another example, the camera channels that are arranged to monitor a same area (e.g., a region of interest) may be determined to be correlated with each other. In some embodiments, the correlation between the camera channels may be determined by a user according to actual needs. For example, the user may group all the camera channels in the video displaying system 100 into different groups, and the camera channels belonging to each group may be determined to be correlated with each other. Specifically, the user may group all the camera channels that are mounted at each entrance of a community into a same group, and thus the videos captured by the camera channels at the entrances of the community may be correlated with each other.

In some embodiments, the information of correlated camera channels may be stored in a storage device (e.g., the storage 140, the RAM 230, the ROM 220) in the video processing system 100. For each video, the processing device 120 may determine its corresponding camera channel and further identify whether its corresponding camera channel has one or more correlated camera channels.

If the processing device 120 determines that the camera channel of the at least one of the plurality of videos has one or more correlated camera channels, the process 600 may proceed to operation 610. If the processing device 120 determines that the camera channel of the at least one of the plurality of videos has no correlated camera channel, the process 600 may proceed to operation 614.

In 610, the processing device 120 may determine one or more second regions on the display device to display the at least one of the plurality of videos and one or more correlated videos corresponding to the one or more correlated camera channels. In some embodiments, the one or more second regions may be generated by dividing the display device according to the information of the correlated camera channels. For example, the number of the second regions may be set to be equal to the number of the at least one of the plurality of videos and its one or more correlated videos. As another example, the size of each second region may be equally or distinctively set according to, for example, priority information associated with each of the correlated camera channels. Details regarding determining the second regions may be found elsewhere in the present disclosure (e.g., in FIG. 7 and FIG. 11, and the descriptions thereof).

In 612, the processing device 120 may jointly display the at least one of the plurality of videos and the one or more correlated videos on the one or more second regions of the display device. In some embodiments, the processing device 120 may display the at least one of the plurality of videos and the one or more correlated videos without concurrently displaying any other videos of the plurality of videos.

In some embodiments, the size of each second region may be adjusted by the user. For example, the user may manually resize one of the second regions, and the processing device 120 may correspondingly adjust the other second regions to properly display the correlated videos. Details regarding adjusting the second regions may be found elsewhere in the present disclosure (e.g., in FIG. 7 and FIG. 12, and the descriptions thereof).

In 614, in response to the determination that the camera channel of the at least one of the plurality of videos has no correlated camera channel, the processing device 120 may independently display the at least one of the plurality of videos. For example, the processing device 120 may display the at least one of the plurality of videos in full-screen, or in any region of the display device without displaying any other videos. In some embodiments, the user may be able to manually adjust the size of the independent display region of the video. For example, the user may zoom in or zoom out the display region of the video by a rolling operation of the mouse.

It should be noted that the above description of the process 600 is merely provided for the purposes of illustration, and not intended to limit the scope of the present disclosure. For persons having ordinary skills in the art, various variations and modifications may be performed in the light of the present disclosure. For example, operation 610 may be divided into one or more operations. As another example, operation 614 may be modified in such a manner that, if the camera channel of the at least one of the plurality of videos has no correlated camera channel, the display device may maintain the concurrent display of the plurality of videos on the one or more first regions of the display device.

Figure 7:
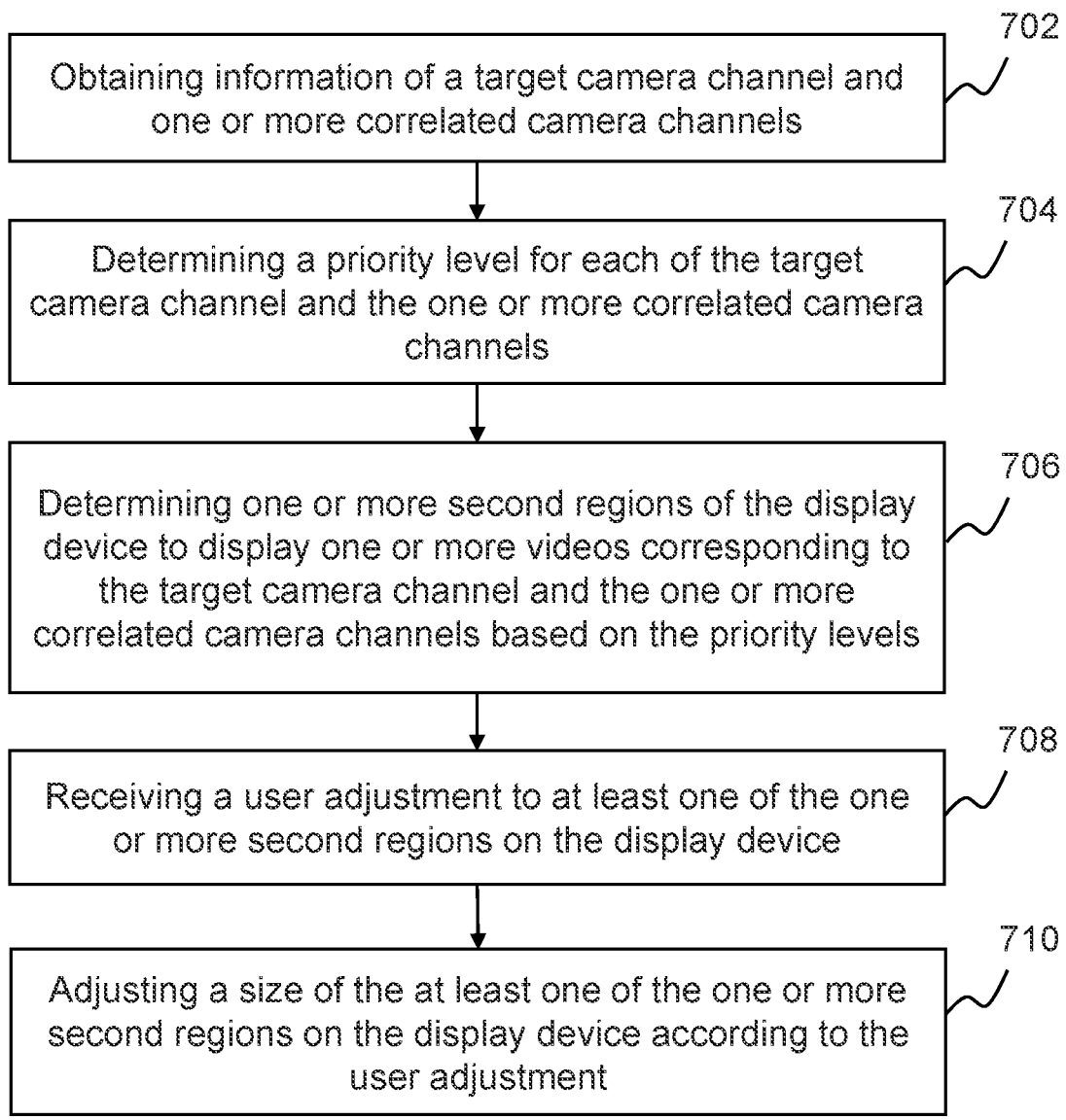
FIG. 7 is a flowchart illustrating an exemplary process for determining a second region according to some embodiments of the present disclosure.

FIG. 7 is a flowchart illustrating an exemplary process for determining a second region according to some embodiments of the present disclosure. The process 700 may be executed by the video processing system 100. For example, the process 600 may be implemented as a set of instructions (e.g., an application) stored in the storage ROM 220 or RAM 230. The CPU 210 may execute the set of instructions and may accordingly be directed to perform the process 700. The process 700 may be executed by the modules in the processing device 120. The operations of the illustrated process presented below are intended to be illustrative. In some embodiments, the process may be accomplished with one or more additional operations not described, and/or without one or more of the operations discussed. Additionally, the order of the operations of the process as illustrated in FIG. 7 and described below is not intended to be limiting. In some embodiments, operation 610 may be achieved by performing the process 700.

In 702, the processing device 120 (e.g., the information obtaining module 410) may obtain information of a target camera channel and one or more correlated camera channels. For brevity, the target camera channel and the one or more correlated camera channels may be referred to as selected camera channels hereafter. The information of the selected camera channels may include the number of the selected camera channels, the resolution ratio of the video of each of the selected camera channels, the height and width of the video of each of the selected camera channels, etc. In some embodiments, the processing device 120 may determine a primary camera channel and one or more secondary camera channels among the selected camera channels. The video corresponding to the primary camera channel may be equipped with a better display condition than the video(s) of the secondary camera channel(s). For example, the video corresponding to the primary camera channel may be equipped with a higher resolution ratio than the video(s) corresponding to the secondary camera channel(s). In some embodiments, the processing device 120 may assign each of the selected camera channels with a serial number, such as, camera channel 1.1, camera channel 1.2, and camera channel 1.3, etc. In some embodiments, the information of the selected camera channels may be stored in a storage device (e.g., storage 140, ROM 220, or RAM 230) in the video processing system 100.

In 704, the processing device 120 (e.g., the priority level determination module 420) may determine a priority level for each of the selected camera channels.

In some embodiments, the processing device 120 may determine the priority level for each of the selected camera channels based on the properties of the selected camera channels. For example, assuming that the selected camera channels may include a primary camera channel and a secondary camera channel (of a multi-camera), the processing device 120 may assign the primary camera channel with a higher priority level than the secondary camera.

In some embodiments, the processing device 120 may determine the priority level for each of the selected camera channels based on the properties of the videos corresponding to the selected camera channels. For example, assuming that the selected camera channels may include a first camera whose corresponding video has a higher resolution ratio, and a second camera whose corresponding video has a lower resolution ration, the processing device 120 may assign the first camera channel with a higher priority level than the second camera channel. As another example, assuming that the selected camera channels may include a third camera channel whose corresponding video frame has a larger size (e.g., a larger height and width), and a fourth camera whose corresponding video frame has a smaller size (e.g., a smaller height and width), the processing device 120 may assign the third camera channel with a higher priority level than the fourth camera channel.

In some embodiments, the different factors used to determine the priority level for each of the selected camera channels described above may be considered in a sequential order. For example, the processing device 120 may first determine the priority level based on whether a selected camera channel is a primary or secondary camera channel. If further determination is needed, the processing device 120 may compare the resolution ratios of the selected camera channels to determine their priority levels. If further determination is stilled needed (e.g., both of two selected camera channels are secondary camera channels, and have a same resolution ratio), the processing device 120 may compare the height and width of the video frames of the selected camera channels to determine the priority levels.

In 706, the processing device 120 (e.g., the region determination module 430) may determine one or more second regions of the display device to display one or more videos corresponding to the selected camera channels based on the priority levels.

In some embodiments, the second region to display a video of a selected camera channel with a higher priority level may be determined before the second region to display another video of a selected camera channel with a lower priority level. Specifically, the second region for displaying the video of the selected camera channel with the highest priority level may be firstly determined based on the information of the selected camera channel. For example, the position of the second region for displaying the video of the selected camera channel with the highest priority level (also referred to as "highest priority level video" for brevity) may be allocated in the display area of the display device, and then the size of the second region for displaying the highest priority level video may be calculated. Next, the second region to display the video of the camera channel with the second-highest priority level (also referred to as "second highest priority level video" for brevity) may be determined, and so on. In some embodiments, the size of the second region to display the highest priority level video may approach the actual size of the video to realize a higher quality of reproduction, and the second region(s) to display the lower priority level video(s) may be resized to fit with the display area of the display device.

In some embodiments, the positions of the second regions may be determined according to a preset template. Different numbers of selected camera channels may correspond to different preset templates. In such case, a total number of two selected camera channels may correspond to a preset template distinct from a total number of three or four selected camera channels. Examples regarding the determination of the second regions may be found elsewhere in the present disclosure (e.g., in FIG. 9 to FIG. 11, and the descriptions thereof).

In 708, the processing device 120 (e.g., the information obtaining module 410) may receive a user adjustment to at least one of the one or more second regions on the display device. In some embodiments, the user adjustment to the at least one of the one or more second regions may refer to resizing the at least one of the one or more second regions by the user. For example, if the user desires to watch a target video with an enlarged size while also watching its correlated video(s) concurrently, the user may input a signal to resize the corresponding second region of the target video. In some embodiments, the input signal may be triggered by a rolling operation of the mouse in the second region where the target video is displayed. For example, if the user desires to watch the target video in the second region with a larger size, the user may roll forward the mouse wheel. If the user desires to watch the target video in the second region with a smaller size, the user may roll backward the mouse wheel.

In 710, the processing device 120 (e.g., the region adjustment module 440) may adjust a size of the at least one of the one or more second regions on the display device according to the user adjustment. In some embodiments, the processing device 120 may receive the input signal associated with the user adjustment, and perform a corresponding operation to resize the at least one of the one or more second regions. For example, the process device 120 may zoom in the second region where the target video is displayed to display the target video with a larger size, and zoom out the second region where the target video is displayed to display the target video with a smaller size.

In some embodiments, when the size of a target second region (i.e., the second region where the target video is displayed) is adjusted, the size(s) of the other second region(s) may be adjusted automatically to fit with the display area of the display device. For example, the processing device 120 may simultaneously zoom in the target second region and zoom out the other second region(s) such that the total width/height of all the second regions are limited within the width/height of the display area.

In some embodiments, the size change of the target second region may have a maximum limit and a minimum limit. When the size of the target second region reaches the maximum limit or the minimum limit, the processing device 120 may stop the adjustment and/or warn the user that the size of the target second region can't be adjusted further. For example, the processing device 120 may change the color of the target second region, play a warning voice or symbol, etc., to tell the user that the target second region has reached the largest or smallest size. Examples regarding adjusting the size of the at least one of the second regions may be found elsewhere in the present disclosure (e.g., in FIG. 12, and the descriptions thereof).

It should be noted that the above description of the process 700 is merely provided for the purposes of illustration, and not intended to limit the scope of the present disclosure. For persons having ordinary skills in the art, various variations and modifications may be performed in the light of the present disclosure. For example, operation 708 may be divide into two steps. In the first step, the processing device 120 may receive the user adjustment, and in the second step, the processing device 120 may determine the corresponding operation associated with user adjustment. As another example, operations 708 and 710 may be omitted.

Figure 8:
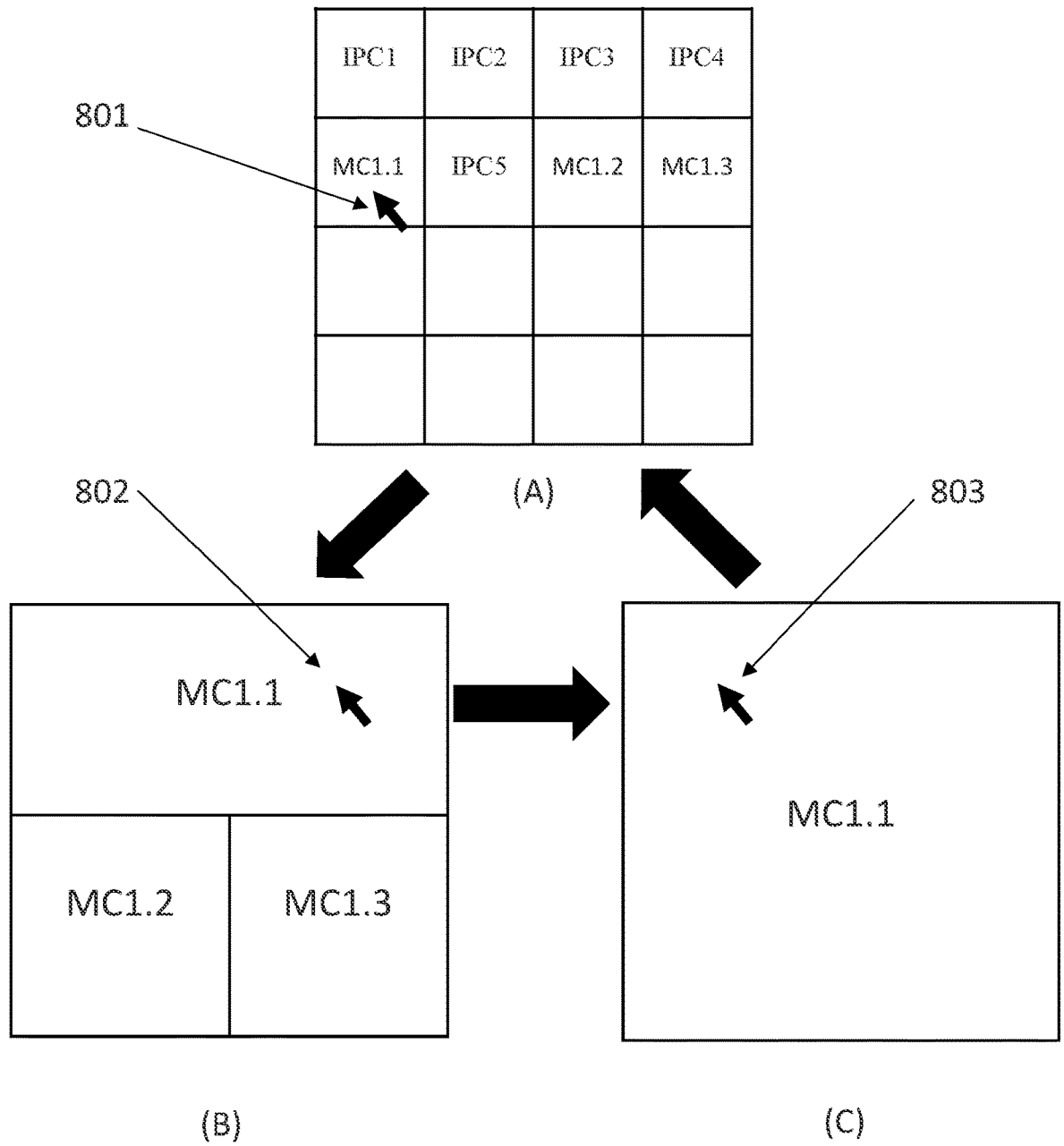
FIG. 8 illustrates examples of different display modes according to some embodiments of the present disclosure.

FIG. 8 illustrates examples of different display modes according to some embodiments of the present disclosure. As shown in example (A), the display area of the display device is divided into 4×4 first regions. In the first row, the four first regions are used to display the videos generated by four IPCs (IPC1, IPC2, IPC3, and IPC4), respectively. Another first region for displaying the video generated by an IPC5 is placed in row two, column two. Each of the five IPCs corresponds to a distinctive camera channel. The rest first regions in the second row are used to display the videos generated by a multi-camera which has three correlated camera channels MC1.1, MC 1.2 and MC 1.3.

A user may click the mouse 801 in the first region corresponding to the camera channel MC1.1. The processing device 120 may identify the correlated camera channels of the camera channel MC1.1 (i.e., camera channel MC 1.2 and camera channel MC 1.3). Then, the processing device 120 may change the display mode from example (A) to example (B). In example (B), the videos of the correlated camera channels MC1.1, MC 1.2 and MC 1.3 are concurrently displayed in three second regions, without displaying other videos in the example (A). As shown in example (B), the video of the camera channel MC1.1 is displayed in a second region in the first row alone, and the videos of the camera channels MC1.2 and MC1.3 are displayed in the second row together. In some embodiments, the processing device 120 may determine the second regions in example (B) according to the process 700.

In example (B), the user may further click the mouse 802 in the second region corresponding to the camera channel MC1.1. The processing device 120 may change the display mode from example (B) to example (C). In example (C), video of the camera channel MC1.1 is displayed in full-screen, independently. Furthermore, in example (C), the user may click the mouse 803 in the display region of the camera channel MC1.1, the processing device 120 may change the display mode from example (C) back to example (A).

Figure 9:
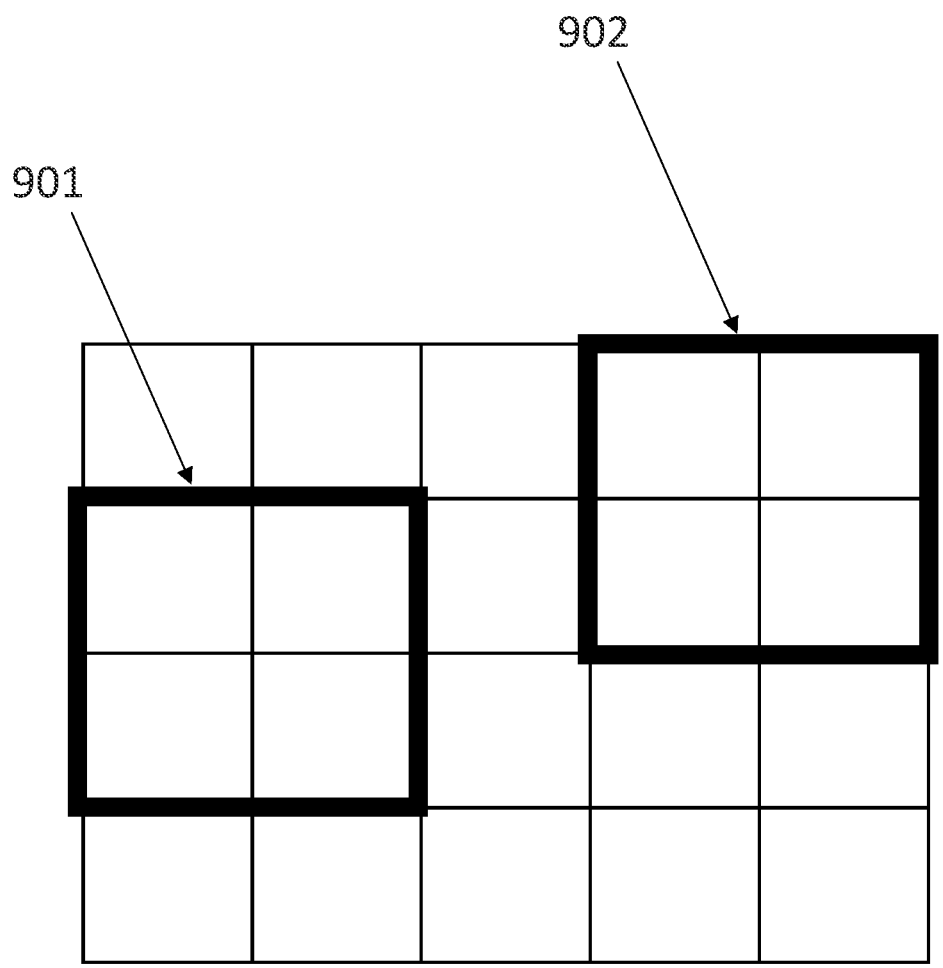
FIG. 9 illustrates an example of second regions according to some embodiments of the present disclosure.

FIG. 9 illustrates an example of second regions according to some embodiments of the present disclosure. As shown in FIG. 9, it is assumed that a multi-camera has two correlated camera channels. The display area of the display device is divided into 5×4 first regions. A second region 901 and a second region 902 are two second regions to display the videos of the two correlated camera channels, respectively. In some embodiments, the distance between each boundary of a second region and the left boundary or the top boundary of the display area is used to define the coordinate of the second region. For the second region 901, the distance from the left boundary of the second region 901 to the left boundary of the display area is 0, the distance from the top boundary of the second region 901 to the top boundary of the display area is 1 (block of the first region), the distance from the right boundary of the second region 901 to the left boundary of the display area is 2 (blocks of the first region), and the distance from the bottom boundary of the second region 901 to the top boundary of the display area is 3 (blocks of the first region). Therefore, the coordinate of the second region 901 is denoted as {0, 1, 2, 3}. Similarly, the coordinate of the second region 902 is denoted as {3, 0, 5, 2}. Then, the processing device 120 may transform the coordinates of the second regions 901 and 902 to the coordinates of the display screen of the display device to generate the second regions.

Figure 10:
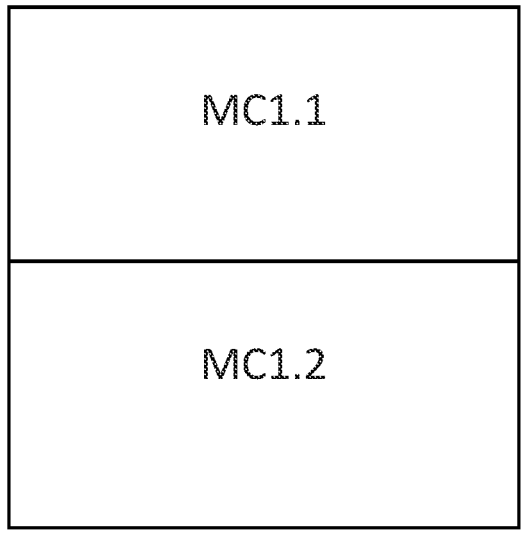
FIG. 10 illustrates examples of allocating second regions according to some embodiments of the present disclosure.
Figure 10:
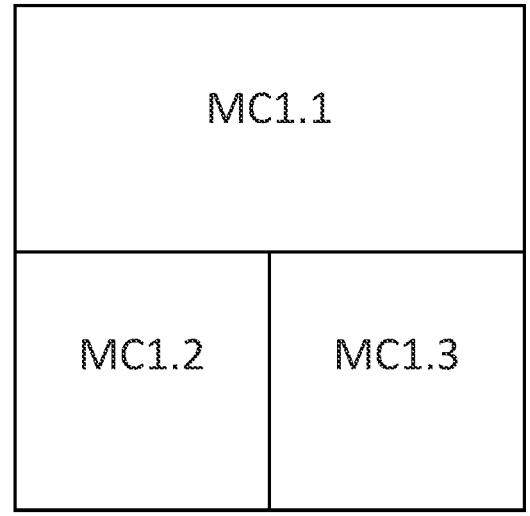
Figure 10:
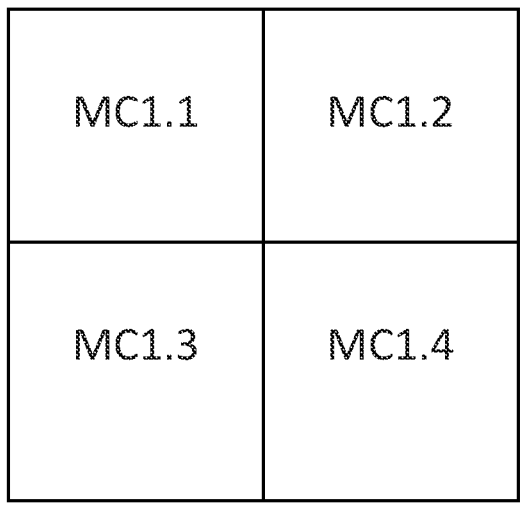
Figure 10:
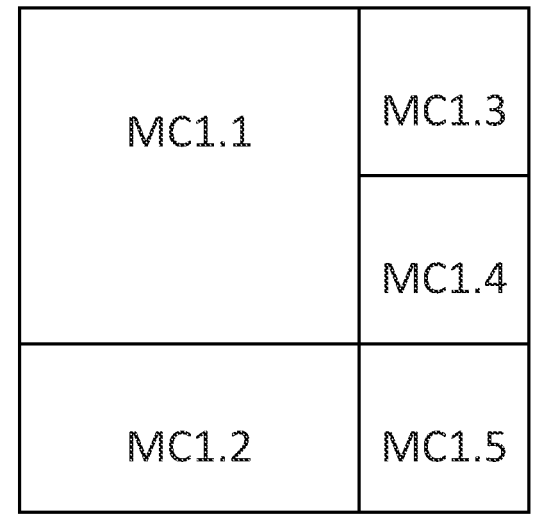

FIG. 10 illustrates examples of allocating second regions according to some embodiments of the present disclosure. According to the description above, the processing device 120 may divide the display area of the display device into one or more second regions based on the number of the correlated camera channels (e.g., the camera channels of a multi-camera). In FIG. 10, the number of the correlated camera channels is equal to the number of the second regions. The examples (a), (b), (c) and (d) may be regarded as four preset templates corresponding to four situations of correlated camera channels. In example (a), the number of the correlated camera channels is two, and two second regions are allocated equally on the display area of the display device. In example (b), the number of the correlated camera channels is three, and three second regions are allocated on the display area of the display device. In example (b), the camera channel MC1.1 may be the primary camera channel that corresponds to the largest second region. In example (c), the number of the correlated camera channels is four, and four second regions are allocated equally on the display area of the display device. In example (d), the number of the correlated camera channels is five, and five second regions are allocated on the display area of the display device. In example (d), the camera channel MC1.1 may be the primary camera channel that corresponds to the largest second region.

It should be noted that the above description in the FIG. 0.10 is merely provided for the purposes of illustration, and not intended to limit the patterns for allocating the second regions, and a user can manually set or adjust the second regions based on the actual requirement.

Figure 11:
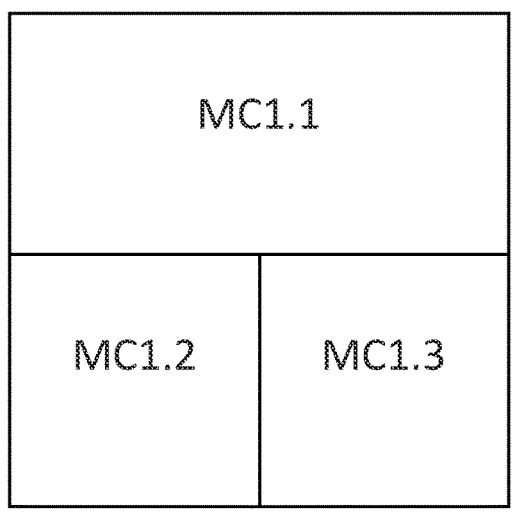
FIG. 11 illustrates an example of determining the second regions according to some embodiments of the present disclosure.
Figure 11:
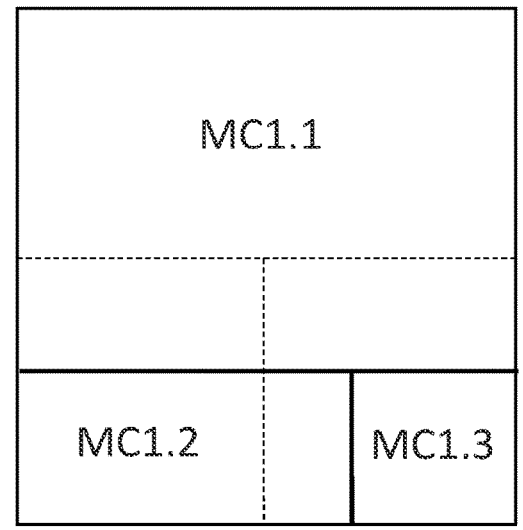

FIG. 11 illustrates an example of determining the second regions according to some embodiments of the present disclosure. Example (1) illustrates the allocation of the second regions in a preset template, and example (2) illustrates the allocation of the actual second regions (solid line) determined by the processing device 120. In FIG. 11, the number of the correlated camera channels is three, and the camera channel MC1.1 is a primary camera channel. The priority levels of the three correlated camera channels are sequenced as: MC1.1>MC1.2>MC1.3. In example (2), the processing device 120 may first determine the size of the second region for displaying the video corresponding to the primary camera channel MC1.1, to approach the actual size of the video frame. In the meantime, the processing device 120 may resize the second regions for displaying the videos corresponding to the camera channels MC1.2 and MC1.3, to fit with the display area of the display device.

In some embodiment, for each of the correlated camera channels, the processing device 120 may determine the aspect ratio of the corresponding second region based on the resolution ratio of the video corresponding to the correlated camera channel. In such case, the aspect ratio of the video frame corresponding to the camera channel MC1.1 may be equal to the aspect ratio of the second region for displaying the video corresponding to the camera channel MC1.1. The aspect ratio of the video frames corresponding to the camera channels MC1.2 and MC1.2 may be adjusted to be closed to the aspect ratios of the second regions for displaying the videos corresponding to the camera channels MC1.2 and MC1.2.

Figure 12:
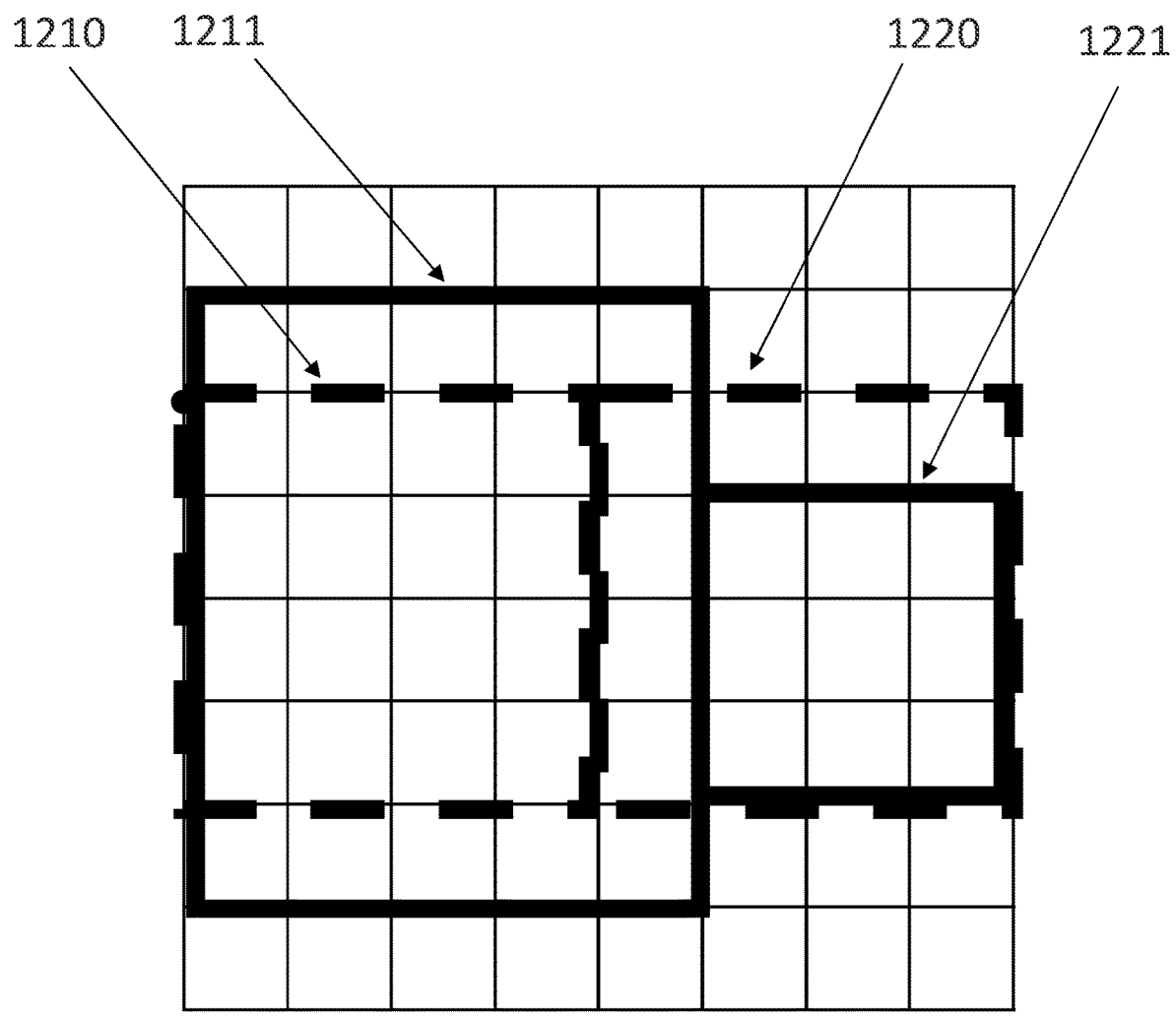
FIG. 12 illustrates an example of adjusting sizes of the second regions based on a user adjustment according to some embodiments of the present disclosure.

FIG. 12 illustrates an example of adjusting sizes of the second regions based on a user adjustment according to some embodiments of the present disclosure. As shown in the FIG. 12, the regions 1210 and 1220 (in dashed lines) are two original second regions. The original second region 1210 may be adjusted by a user to become the second region 1211 (in solid lines), and the original second region 1220 may be resized automatically to become the second region 1221 (in solid lines). In some embodiments, the coordinate of the original second region 1210 may be modified according to the adjustment (e.g., zooming operation), and the coordinate of the original second region 1220 may be adjusted accordingly. As shown in FIG. 12, the original second region 1210 is zoomed in to be the second region 1211, and the original second region 1220 is zoomed out to be the second region 1221.

It should be noted that the description above is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. Similar modifications should fall within the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

We claim:

1. A system, comprising:
   at least one storage medium including a set of instructions; and
   at least one processor in communication with the at least one storage medium, wherein when executing the set of instructions, the at least one processor is directed to cause the system to:
      concurrently display a plurality of videos in a plurality of first regions of a display device, each of the plurality of videos corresponding to a camera channel;
      receive an input signal associated with at least one of the plurality of videos;
      determine whether a camera channel of the at least one of the plurality of videos has one or more correlated camera channels; and
      in response to determining that the camera channel of the at least one of the plurality of videos has one or more correlated camera channels,
         determine a priority level for each of the at least one of the plurality of videos and the one or more correlated videos based on a resolution ratio or a size of the each of the at least one of the plurality of videos and the one or more correlated videos; and
         successively determine a second region of the display device to display each of the at least one of the plurality of videos and the one or more correlated videos based on the priority levels, wherein a size of the second region is determined based on the resolution ratio or the size of a corresponding video.

2. The system of claim 1, wherein the plurality of videos are concurrently displayed on different regions of the display device.

3. The system of claim 2, wherein the input signal associated with the at least one of the plurality of videos includes a click operation in a region of the at least one of the plurality of videos.

4. The system of claim 1, wherein the at least one of the plurality of videos and the one or more correlated videos are jointly displayed, without concurrently displaying any other videos of the plurality of videos.

5. The system of claim 1, wherein
the second regions are arranged on the display device according to a number of the at least one of the plurality of videos and the one or more correlated videos.

6. The system of claim 1, wherein a size or a position of the second region to display each of the at least one of the plurality of videos and the one or more correlated videos is determined based on information of the camera channels of the at least one of the plurality of videos and the one or more correlated videos.

7. The system of claim 1, wherein the at least one processor is directed to cause the system to:
   receive a user adjustment to at least one of the second regions on the display device; and
   adjust a size of the at least one of the second regions on the display device according to the user adjustment.

8. The system of claim 4, wherein the at least one processor is directed to cause the system to:
   while jointly displaying the at least one of the plurality of videos and the one or more correlated videos, detect an input signal for independent display; and in response to detecting the input signal for independent display, independently display one of the at least one of the plurality of videos and the one or more correlated videos.

9. A method implemented on a computing device including at least one processor and at least one storage medium, the method comprising:
concurrently displaying a plurality of videos in a plurality of first regions of display device, each of the plurality of videos corresponding to a camera channel;
receiving an input signal associated with at least one of the plurality of videos;
determining whether a camera channel of the at least one of the plurality of videos has one or more correlated camera channels; and
in response to determining that the camera channel of the at least one of the plurality of videos has one or more correlated camera channels,
determine a priority level for each of the at least one of the plurality of videos and the one or more correlated videos based on a resolution ratio or a size of the each of the at least one of the plurality of videos and the one or more correlated videos; and
successively determine a second region of the display device to display each of the at least one of the plurality of videos and the one or more correlated videos based on the priority levels, wherein a size of the second region is determined based on the resolution ratio or the size of a corresponding video.

10. The method of claim 9, wherein the plurality of videos are concurrently displayed on different regions of the display device.

11. The method of claim 10, wherein the input signal associated with the at least one of the plurality of videos includes a click operation in a region of the at least one of the plurality of videos.

12. The method of claim 9, wherein the at least one of the plurality of videos and the one or more correlated videos are jointly displayed, without concurrently displaying any other videos of the plurality of videos.

13. The method of claim 9, wherein
the second regions are arranged on the display device according to a number of the at least one of the plurality of videos and the one or more correlated videos.

14. The method of claim 9, wherein a size or a position of the second region to display each of the at least one of the plurality of videos and the one or more correlated videos is determined based on information of the camera channels of the at least one of the plurality of videos and the one or more correlated videos.

15. The method of claim 9, comprising:
receiving a user adjustment to at least one of the second regions on the display device; and
adjusting a size of the at least one of the second regions on the display device according to the user adjustment.

16. The method of claim 12, comprising:
while jointly displaying the at least one of the plurality of videos and the one or more correlated videos, detecting an input signal for independent display; and
in response to detecting the input signal for independent display, independently displaying one of the at least one of the plurality of videos and the one or more correlated videos.

* * * * *